United States Patent
Cohen

(10) Patent No.: US 8,995,516 B2
(45) Date of Patent: Mar. 31, 2015

(54) DEVICES AND METHODS FOR FACILITATING SIGNAL-TO-NOISE RATIO ESTIMATION OF RECEIVED WIRELESS TRANSMISSIONS

(71) Applicant: QUALCOMM Incorporated, San Diego, CA (US)

(72) Inventor: Roee Cohen, Kibbutz Eyal (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/048,709

(22) Filed: Oct. 8, 2013

(65) Prior Publication Data

US 2014/0169503 A1    Jun. 19, 2014

Related U.S. Application Data

(60) Provisional application No. 61/738,373, filed on Dec. 17, 2012.

(51) Int. Cl.
 *H04B 3/46* (2006.01)
 *H04L 27/227* (2006.01)

(52) U.S. Cl.
 CPC .......... *H04L 27/2273* (2013.01); *H04B 17/336* (2013.01)
 USPC ............................ 375/227; 375/329; 375/346

(58) Field of Classification Search
 CPC ........ H04L 27/22; H04L 1/20; H04L 27/2647
 See application file for complete search history.

(56) References Cited

U.S. PATENT DOCUMENTS

| 7,310,369 | B1 | 12/2007 | Krieger et al. |
| 7,764,730 | B2 | 7/2010 | Li et al. |
| 2003/0072392 | A1 | 4/2003 | Beadle et al. |
| 2010/0054319 | A1 | 3/2010 | Lee |
| 2011/0188561 | A1 | 8/2011 | Mizrahi et al. |

FOREIGN PATENT DOCUMENTS

| WO | 2007113511 A1 | 10/2007 |
| WO | WO-2008005073 A1 | 1/2008 |

OTHER PUBLICATIONS

Gappmair et al ("ML and EM algorithm for non-data-aided SNR estimation of linearly modulated signals", 6th International Symposium on Communication Systems, Networks and Digital Signal Processing (CNSDSP), Jul. 25, 2008, IEEE, Piscataway, N J, USA, pp. 530-534, XP031314839, ISBN: 978-1-4244-1875-6).*

(Continued)

*Primary Examiner* — Leon-Viet Nguyen
(74) *Attorney, Agent, or Firm* — Loza & Loza LLP

(57) ABSTRACT

Access terminals are adapted to facilitate estimation of signal-to-noise ratios for received wireless transmissions. According to at least one example, a wireless communication device can receive a plurality of data symbols. The wireless communication device can determine a first estimate of a signal-to-noise ratio based on first estimates of a signal power and a noise power associated with the plurality of received data symbols. When the first estimate of the signal-to-noise ratio is below a predetermined threshold, a second estimate of the signal-to-noise ratio can be determined based on second estimates of the signal power and the noise power for the received data symbols. Other aspects, embodiments, and features are also included.

24 Claims, 9 Drawing Sheets

(56) References Cited

OTHER PUBLICATIONS

Alvarez-Diaz M. et al., "SNR Estimation for Multilevel Constellations Using Higher-Order Moments", IEEE Transactions on Signal Processing, Mar. 1, 2010, IEEE Service Center, New York, NY, US, vol. 58, No. 3, pp. 1515-1526, XP011297221, ISSN: 1053-587X.

Gappmair W. et al., "ML and EM algorithm for non-data-aided SNR estimation of linearly modulated signals", 6th International Symposium on Communication Systems, Networks and Digital Signal Processing (CNSDSP), Jul. 25, 2008, IEEE, Piscataway, NJ, USA, pp. 530-534, XP031314839, ISBN: 978-1-4244-1875-6.

Ijaz A. et al., "Signal-to-Noise Ratio Estimation Algorithm for Advanced DVB-RCS Systems", IEEE Transactions on Broadcasting, Dec. 1, 2012, IEEE Service Center, Piscataway, NJ, US, vol. 58, No. 4, pp. 603-608, XP011472242, ISSN: 0018-9316, DOI: 10.1109/TBC.2012.2218074.

International Search Report and Written Opinion—PCT/US2013/073872—ISA/EPO—Feb. 24, 2014.

Pauluzzi D. R. et al., "A comparison of SNR estimation techniques for the AWGN channel", IEEE Transactions on Communications, Oct. 1, 2000, IEEE Service Center, Piscataway, NJ. USA, vol. 48, No. 10, pp. 1681-1691, XP011009781, ISSN: 0090-6778, DOI: 10.1109/26.871393.

Wang A. et al., "Comparison of Several SNR Estimators for QPSK Modulations", International Conference on Computer Science & Service System (CSSS), Aug. 11, 2012, IEEE, pp. 77-80, XP032295014, DOI: 10.1109/CSSS.2012.28 ISBN: 978-1-4673-0721-5.

Norman C. Beaulieu, et al.; Comparison of Four SNR Estimators for QPSK Modulations; IEEE Communications Letters, vol. 4, No. 2, Feb. 2000, pp. 43-45.

Hua Xu, et al.; The Simple SNR Estimation Algorithms for MPSK Signals; ICSP'04 Proceedings; pp. 1781-1785.

A. Ramesh, et al.; SNR Estimation in Nakagami-m Fading With Diversity Combining and Its Application to Turbo Decoding; IEEE Transactions on Communications, vol. 50, No. 11, Nov. 2002, pp. 1719-1724.

Dong-Joon Shin, et al.; Simple SNR Estimation Methods for QPSK Modulated Short Bursts; IEEE, 2001, pp. 3644-3647.

Bin Li, et al.; A Low Bias Algorithm to Estimate Negative SNRs in an AWGN Channel; IEEE Communications Letters, vol. 6, No. 11, Nov. 2002, pp. 469-471.

Bin Li, et al.; New Results on SNR Estimation of MPSK Modulated Signals; The 14$^{th}$ IEEE 2003 International Symposium on Personal, Indoor and Mobile Radio Communication Proceedings; pp. 2373-2377.

\* cited by examiner

DEVICES AND METHODS FOR FACILITATING SIGNAL-TO-NOISE RATIO ESTIMATION OF RECEIVED WIRELESS TRANSMISSIONS

CLAIM OF PRIORITY UNDER 35 U.S.C. §119

The present application for patent claims priority to Provisional Application No. 61/738,373 entitled "Apparatus and Method for Blind SNR Estimation from QPSK Symbols" filed Dec. 17, 2012, and assigned to the assignee hereof and hereby expressly incorporated by reference herein.

TECHNICAL FIELD

The technology discussed below relates generally to wireless communications, and more specifically to methods and devices for estimation of a signal-to-noise ratio of a received wireless transmission.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

In a UTRAN, among other wireless access networks, quadrature phase shift keying (QPSK) is a frequently utilized modulation technique in which a 2-bit symbol is encoded by controlling the phase of two carrier waves, referred to as an in-phase (I) carrier and a quadrature (Q) carrier. One consideration in decoding received QPSK signals is an estimation of the signal-to-noise ratio (SNR) of the received transmission. The SNR estimate additionally may be used for other purposes, such as power control of the transmission. While many SNR estimation techniques are known in the art, there remains a desire in the art to improve the performance of an SNR estimation algorithm, as well as to simplify the computational complexity of such an algorithm.

Thus, as the demand for mobile broadband access continues to increase, research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate estimating a signal-to-noise (SNR) for QPSK signals. According to at least on aspect of the disclosure, wireless communication devices may include a communications interface and a storage medium each be coupled with a receiver. The receiver may be adapted to receive, via the communications interface, a plurality of data symbols, and determine a first estimate of a signal-to-noise ratio based on a first estimate of a signal power associated with the plurality of received data symbols and a first estimate of a noise power associated with the plurality of received data symbols. In some instances, the first estimate may be determined from a decision-directed estimation. The processing circuit may further be adapted to determine a second estimate of a signal-to-noise ratio based on a second estimate of the signal power associated with the plurality of received data symbols and a second estimate of the noise power associated with the plurality of received data symbols when the first estimate of the signal-to-noise ratio is below a predetermined threshold. In some instances, the second estimate may be determined from a maximum likelihood estimation or a Z-method estimation.

Further aspects provide methods operational on wireless communication devices and/or wireless communication devices including means to perform such methods. One or more examples of such methods may include receiving a plurality of data symbols, and determining a first estimate of a signal-to-noise ratio based on a first estimate of a signal power associated with the plurality of received data symbols and a first estimate of a noise power associated with the plurality of received data symbols. The first estimates may be determined from a decision-directed estimation. If the first estimate of the signal-to-noise ratio is below a predetermined threshold, a second estimate of a signal-to-noise ratio may be determined based on a second estimate of the signal power and a second estimate of the noise power. The second estimates may be determined from a maximum likelihood estimation or a Z-method estimation.

Still further aspects include processor-readable storage mediums comprising programming executable by a processing circuit. According to one or more examples, such programming may be adapted for causing the processing circuit to determine a first estimate of a signal-to-noise ratio based on a first estimate of a signal power and a first estimate of a noise power associated with a plurality of received data symbols. The programming may further be adapted for causing the processing circuit to determine a second estimate of a signal-to-noise ratio based on a second estimate of the signal power and a second estimate of the noise power when the first estimate of the signal-to-noise ratio is below a predetermined threshold.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for UMTS protocols and systems, and related terminology may be found in much of the following description. However, those of ordinary skill in the art will recognize that one or more aspects of the present disclosure may be employed and included in one or more other wireless communication protocols and systems.

Figure 1:
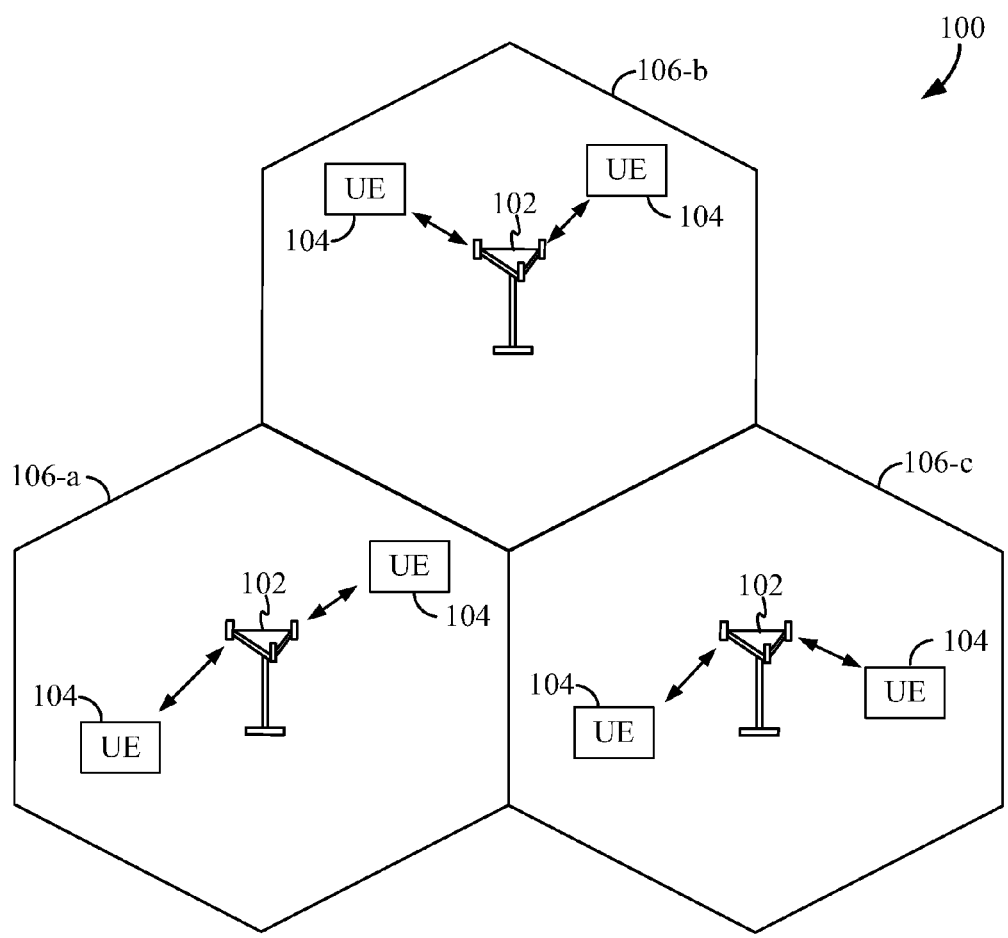
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more node Bs 102 and user equipments (UEs) 104. The node Bs 102 and UEs 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The node Bs 102 can wirelessly communicate with the UEs 104 via a node B antenna. The node Bs 102 may each be implemented generally as a device adapted to facilitate wireless connectivity (for one or more UEs 104) to the wireless communications system 100. Such a node B 102 may also be referred to by those skilled in the art as a base station, a base transceiver station (BTS), a radio base station, a radio transceiver, a transceiver function, a basic service set (BSS), and extended service set (ESS), a femto cell, a pico cell, or some other suitable terminology.

Figure 2:
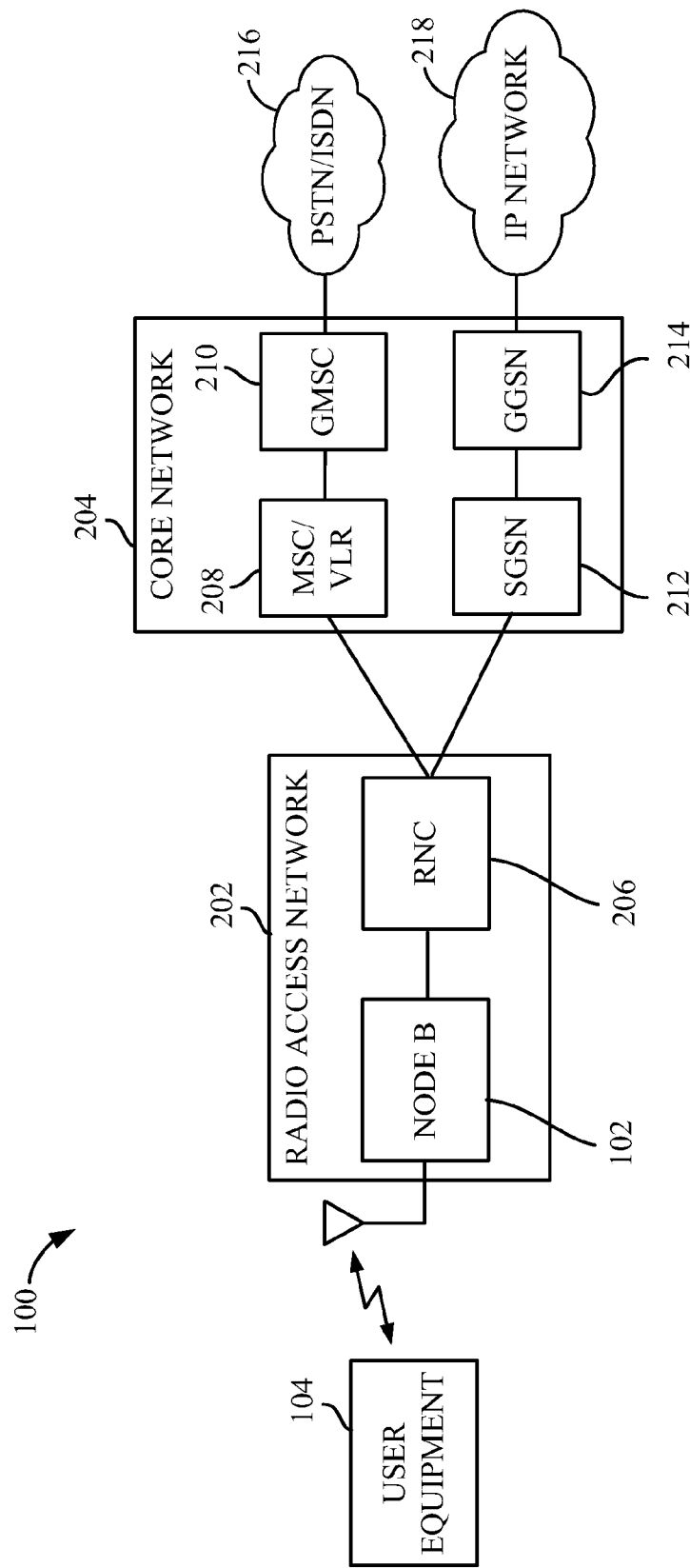
FIG. 2 is a block diagram illustrating select components of the wireless communication system of FIG. 1 according to at least one example.

The node Bs 102 are configured to communicate with the UEs 104 under the control of a radio network controller (see FIG. 2). Each of the node B 102 sites can provide communication coverage for a respective geographic area. The coverage area 106 for each node B 102 here is identified as cells 106-*a*, 106-*b*, or 106-*c*. The coverage area 106 for a node B 102 may be divided into sectors (not shown, but making up only a portion of the coverage area). In various examples, the system 100 may include node Bs 102 of different types.

One or more UEs 104 may be dispersed throughout the coverage areas 106. Each UE 104 may communicate with one or more node Bs 102. A UE 104 may generally include one or more devices that communicate with one or more other devices through wireless signals. Such a UE 104 may also be referred to by those skilled in the art as an access terminal, a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. A UE 104 may include a mobile terminal and/or an at least substantially fixed terminal Examples of a UE 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, router, and/or other communication/computing device which communicates, at least partially, through a wireless or cellular network.

Turning to FIG. 2, a block diagram illustrating select components of the wireless communication system 100 is depicted according to at least one example. As illustrated, the node Bs 102 are included as at least a part of a radio access network (RAN) 202. The radio access network (RAN) 202 is generally adapted to manage traffic and signaling between one or more UEs 104 and one or more other network entities, such as network entities included in a core network 204. The radio access network 202 may, according to various implementations, be referred to by those skill in the art as a UMTS Terrestrial Radio Access Network (UTRAN), a base station subsystem (BSS), an access network, a GSM Edge Radio Access Network (GERAN), etc.

In addition to one or more node Bs 102, the radio access network 202 can include a radio network controller (RNC) 206, which may also be referred to by those of skill in the art as a base station controller (BSC). The radio network controller 206 is generally responsible for the establishment, release, and maintenance of wireless connections within one or more coverage areas associated with the one or more node Bs 102 which are connected to the radio network controller 206. The radio network controller 206 can be communicatively coupled to one or more nodes or entities of the core network 204.

The core network 204 is a portion of the wireless communications system 100 that provides various services to UEs 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. A UE 104 can obtain access to a public switched telephone network (PSTN) 216 via the circuit-switched domain, and to an IP network 218 via the packet-switched domain.

Figure 3:
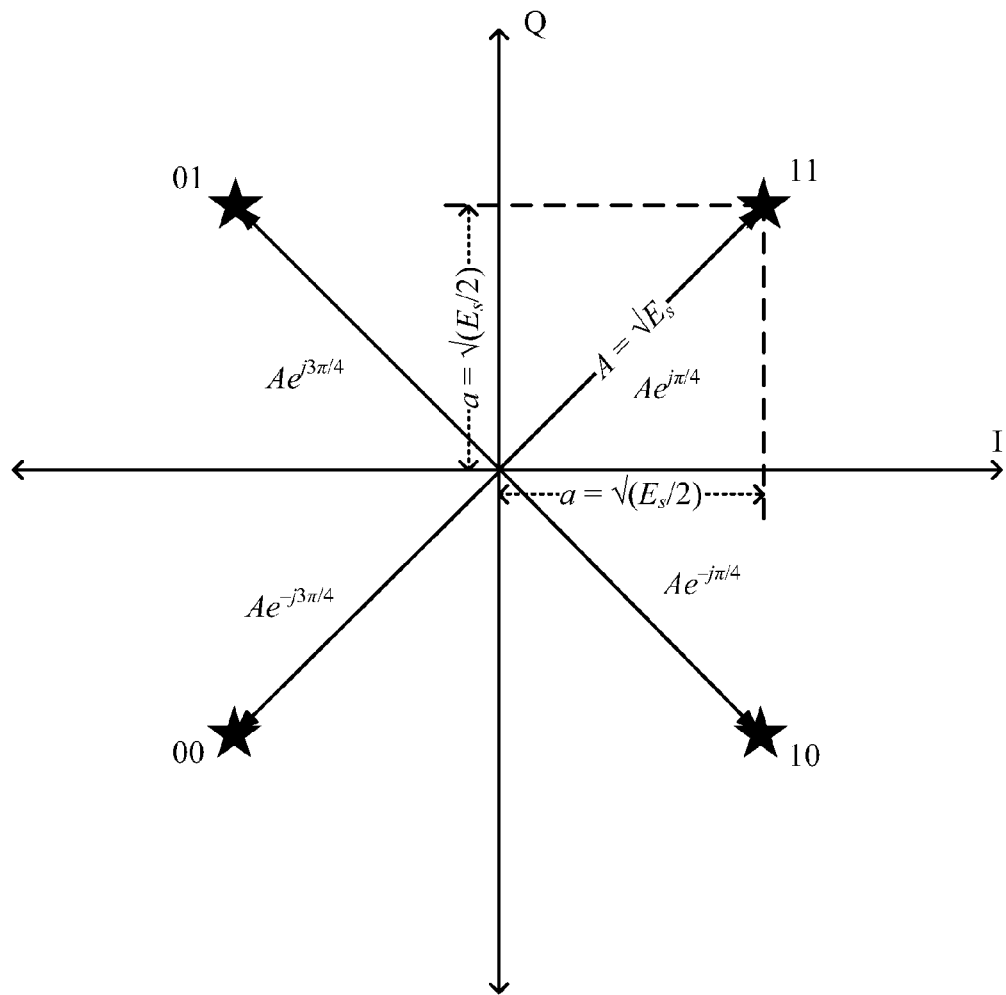
FIG. 3 is a schematic diagram of one example of QPSK modulation, showing the phase of the in-phase carrier 'I' along the horizontal axis and the phase of the quadrature carrier Q along the vertical axis.

As a node B 102 and UE 104 communicate within the wireless communication system 100, the wireless communications devices (e.g., the node B 102 and UE 104) may transmit and receive QPSK-modulated symbols. Quadrature phase-shift keying (QPSK), also known as I-Q/code multiplexing, is a modulation technique in which a 2-bit symbol is encoded by controlling the phase of two carrier waves, referred to as an in-phase (I) carrier and a quadrature (Q) carrier. FIG. 3 is a schematic diagram of one example of QPSK modulation, showing the phase of the in-phase carrier I along the horizontal axis and the phase of the quadrature carrier Q along the vertical axis. That is, a transmitted signal, which may be represented as $s_k$ for each k-th symbol (k=1, 2, ... N), may be represented as one of the vectors $$\left\{ Ae^{\frac{j\pi}{4}}, Ae^{\frac{j3\pi}{4}}, Ae^{\frac{-j3\pi}{4}}, Ae^{\frac{-j\pi}{4}} \right\},$$

each of which may occur with equal probability. Here, A represents the amplitude of the vector, wherein $A=\sqrt{E_s}$, and wherein $E_s$ represents the signal energy. Equivalently, it may be said that each transmitted symbol has a value of ±a ±ja, where j represents $\sqrt{(-1)}$, and where $a=\sqrt{(E_s/2)}$.

In the illustration, a typical 2-bit representation of each vector as 00, 01, 10, 11 is shown, however, other formats may be utilized as well. After the symbols are transmitted over a wireless channel, as detected at the receiver, each transmitted symbol $s_k$ is modified according to noise, interference, and/or characteristics of the channel, as represented by $n_k$. Here, $n_k$ for each sample represents a complex, independent and identically distributed (i.i.d.) variable with independent real and imaginary parts, having a variance of $\sigma^2$ on each axis, and also independent of the QPSK signaling.

When the QPSK symbols are received by a wireless communications device, assuming that time and carrier phase synchronization have been obtained, the received QPSK observations $r_k$ may be expressed as: $r_k = s_k + n_k = Ae^{j\Phi_k} + n_k$, where $\phi_k$ represents the phase of the vector for each observation. Equivalently, each symbol $r_k = (\pm a + n_I) + j(\pm a + n_Q)$, where $n_I$ and $n_Q$, represent the in-phase and quadrature components of the noise signal $n_k$, respectively. Furthermore, $E[|r_k|^2] = E_s + I_{oc}$.

Figure 4:
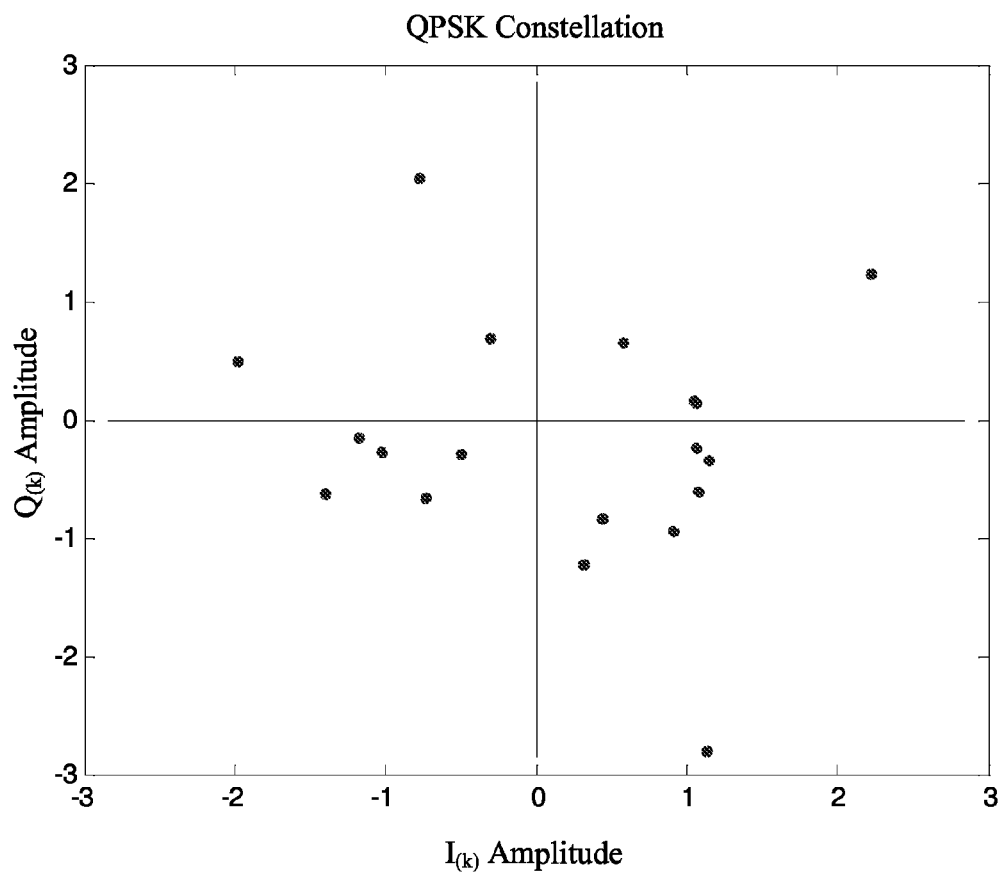
FIG. 4 is a schematic diagram of an exemplary set of received symbols.

FIG. 4 is a schematic diagram of an exemplary set of received symbols $r_k$, showing that they may be rather substantially altered from the transmitted symbols $s_k$, and the estimation of what symbol is intended to be represented by each received symbol may tend to be problematic. The estimation problem may be stated as follows: Given the observation vector $\vec{r} = r_1, r_2 \ldots r_N$, along with its statistical model, estimate signal power $A^2$ and noise power $\sigma^2$, to yield the ratio between those two, namely the SNR.

Numerous types of wireless communications, including but not limited to QPSK, rely on a reasonable SNR estimate for proper operation. For instance, in Code-Division Multiple Access (CDMA) systems, SNR estimation is typically used for power control, to maintain the required link quality while using the minimum transmitted power. Here, the SNR value γ corresponds to $\gamma = E_s/I_{oc}$, wherein $E_s = A^2$ is the power of the received signal, and $I_{oc} = 2\sigma^2$ is the power of the noise signal.

Typically, a wireless communications devices (e.g., a node B 102, a UE 104) will estimate the SNR using a technique based on characteristics of dedicated pilot symbols. However, such techniques for SNR estimation can result in noisy estimates with a high variance.

According to one or more aspects of the present disclosure, wireless communications devices are adapted to employ a blind SNR estimation technique. Such blind SNR estimation techniques of the present disclosure may utilize raw data symbols to compute an SNR estimate. In some examples, the blind SNR estimation techniques disclosed herein may rely solely upon the data symbols, and in other examples, the blind SNR estimation techniques disclosed herein may combine SNR estimation based on data with SNR estimation based on dedicated pilots. The blind SNR estimation techniques of the present disclosure may be utilized to adapt a demodulation algorithm for demodulating received symbols, e.g., QPSK symbols. Of course, the SNR estimates provided herein may be utilized for any other suitable purpose, including but not limited to power control of the received transmission.

Figure 5:
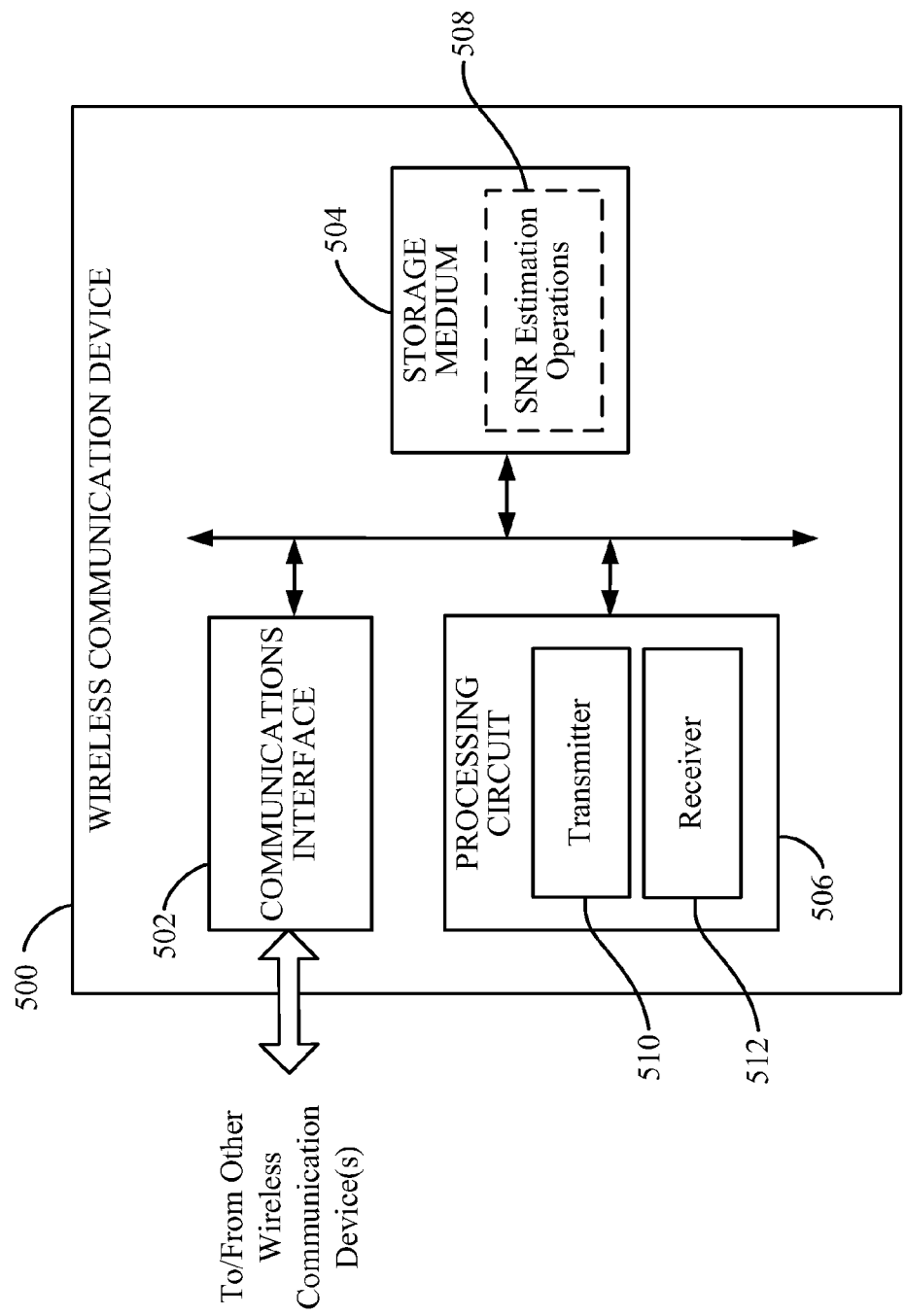
FIG. 5 is a block diagram illustrating select components of a wireless communication device according to at least one example of the present disclosure.

Turning to FIG. 5, a block diagram is shown illustrating select components of a wireless communication device 500 according to at least one example of the present disclosure. The wireless communication device 500 may be implemented, for example, as a node B 102 or a UE 104 of FIGS. 1 and 2, as well as other wireless communication devices. The wireless communication device 500 includes a communications interface 502 and a storage medium 504. The communications interface 502 and the storage medium 504 can both be coupled to or placed in electrical communication with a processing circuit 506.

The communications interface 502 is configured as an interface for wireless communications mediums. For example, the communications interface 502 may be configured to communicate information bi-directionally with respect to other communications devices in a network. The communications interface 502 may be coupled with an antenna (not shown) for facilitating reception and transmission of wireless communications.

The storage medium 504 may represent one or more processor-readable devices for storing programming, such as processor executable code or instructions (e.g., software, firmware), electronic data, databases, or other digital information. The storage medium 504 may also be used for storing data that is manipulated by the processing circuit 506 when executing programming. The storage medium 504 may be any available media that can be accessed by a general purpose or special purpose processor, including portable or fixed storage devices, optical storage devices, and various other mediums capable of storing, containing and/or carrying programming. By way of example and not limitation, the storage medium 504 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 504 may be coupled to the processing circuit 506 such that the processing circuit 506 can read information from, and write information to, the storage medium 504. That is, the storage medium 504 can be coupled to the processing circuit 506 so that the storage medium 504 is at least accessible by the processing circuit 506, including examples where the storage medium 504 is integral to the processing circuit 506 and/or examples where the storage medium 504 is separate from the processing circuit 506 (e.g., resident in the wireless communication device 500, external to the wireless communication device 500, distributed across multiple entities).

Programming stored by the storage medium 504, when executed by the processing circuit 506, causes the processing circuit 506 to perform one or more of the various functions and/or process steps described herein. The processing circuit 506 is adapted for processing, including the execution of programming, which may be stored on the storage medium 504. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Throughout the present disclosure, any reference to programming in relation to one or more features of the processing circuit 506 can include programming stored by the storage medium 504.

In at least one example, the storage medium 504 may include signal-to-noise ratio (SNR) estimation operations 508. The SNR estimation operations 508 are adapted to cause the processing circuit 506 to estimate the signal-to-noise ratio for received transmission, as described herein.

The processing circuit 506 is arranged to obtain, process and/or send data, control data access and storage, issue commands, and control other desired operations. The processing circuit 506 may include circuitry adapted to implement desired programming provided by appropriate media in at least one example. For example, the processing circuit 506 may be implemented as one or more processors, one or more controllers, and/or other structure configured to execute executable programming Examples of the processing circuit 506 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 506 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 506 are for illustration and other suitable configurations within the scope of the present disclosure are also contemplated.

According to one or more aspects of the present disclosure, the processing circuit 506 may be adapted to perform any or all of the processes, functions, steps and/or routines for any or all of the communications devices described herein (e.g., node B 102, UE 104, wireless communication device 500). As used herein, the term "adapted" in relation to the processing circuit 506 may refer to the processing circuit 506 being one or more of configured, employed, implemented, and/or programmed (in conjunction with the storage medium 506) to perform a particular process, function, step and/or routine according to various features described herein.

According to at least one example of the wireless communication device 500, the processing circuit 506 may include a transmitter 510 and a receiver 512 for facilitating bi-directional communications with one or more other devices.

The transmitter circuit/module 510 may also be referred to as a transmit processor, a transmit frame processor, a transmit circuit, a transmitter chain, and/or other suitable terminology by those skilled in the art. The transmitter circuit/module 510 may include circuitry and/or programming adapted to provide various signal processing functions for transmitting data. For example, the transmitter circuit/module 510 can be adapted to provide cyclic redundancy check (CRC) codes for error detection, coding and interleaving to facilitate forward error correction (FEC), mapping to signal constellations based on various modulation schemes (e.g., quadrature phase-shift keying (QPSK)), spreading with orthogonal variable spreading factors (OVSF), and multiplying with scrambling codes to produce a series of symbols. The transmitter circuit/module 510 may further employ the generated symbols to create a frame structure by multiplexing the symbols, resulting in a series of frames. The frames are then provided by the transmitter circuit/module 510 to the communications interface 502, which may provide various signal conditioning functions including amplifying, filtering, and modulating the frames onto a carrier for downlink transmission over the wireless medium through an antenna.

The receiver 512, which may also be referred to by those skilled in the art as a receive processor, receive frame processor, channel processor, receive circuit, receiver chain, and/or other suitable terminology, may include circuitry and/or programming adapted to provide various signal processing functions for recovering transmitted data. In general, the receiver 512 is adapted to employ the SNR estimation operations 508 to determine or estimate signal-to-noise ratios associated with received symbols as a part of the process for recovering transmitted data.

Figure 6:
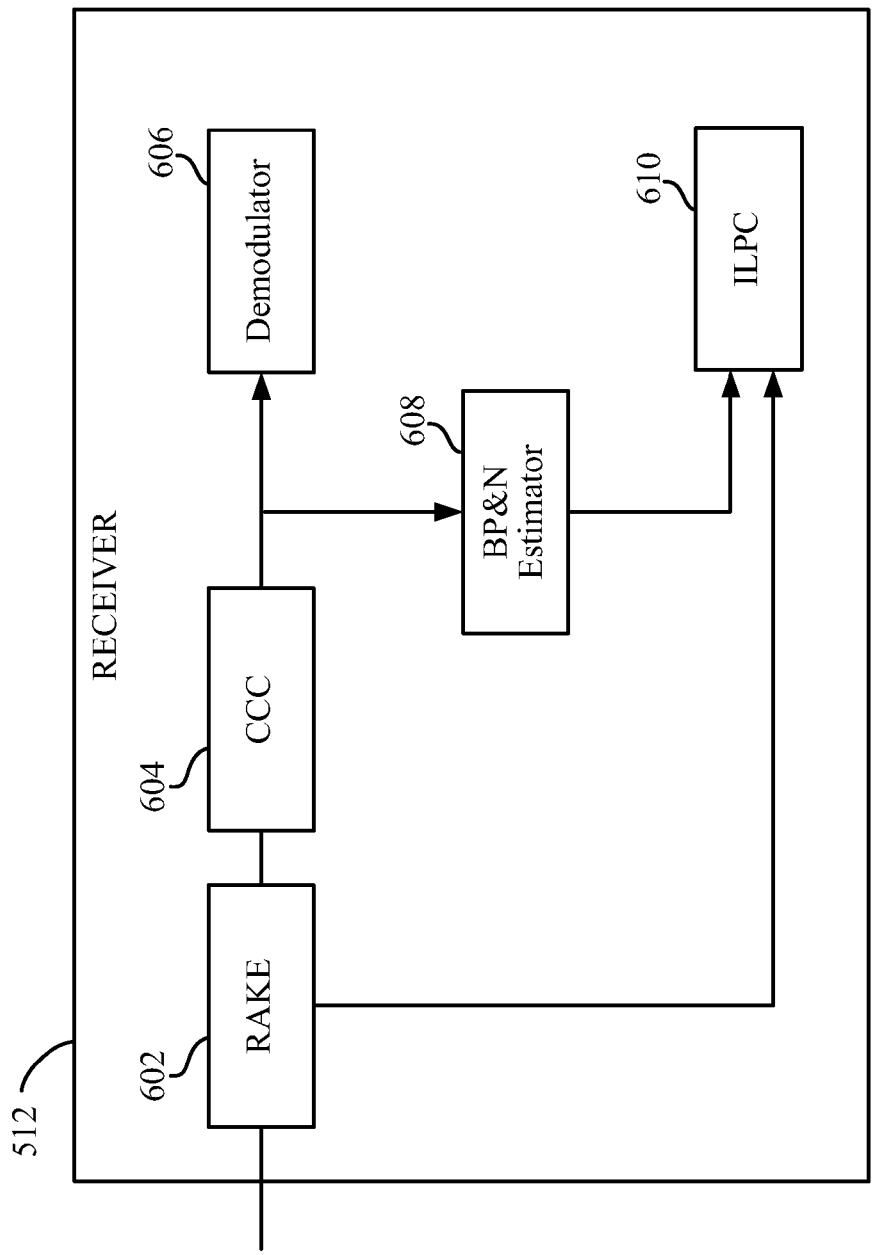
FIG. 6 is a block diagram illustrating select components of at least one example of a receiver.

FIG. 6 is a block diagram illustrating select components of at least one example of a receiver 512. In the depicted example, the receiver 512 includes a Rake component 602, a CCC 604, a demodulator 606, a blind, power & noise (BP&N) estimator 608, and an inner loop power controller (ILPC) 610.

The Rake component 602 may represent circuitry and/or programming adapted to receive multipath transmissions. The Rake component 602 can include a plurality of fingers for receiving transmission over a multipath channel. The Rake component 602 may generate an estimate of signal power, based on dedicated pilots, and an estimate of noise power based on a CPICH pilot transmission. These estimates may be conveyed to the ILPC 610.

The CCC 604 represents circuitry and/or programming adapted to perform cross cell combining, and the demodulator 606 represents circuitry and/or programming adapted for de-rate matching, deinterleaving and decoding.

The blind power & noise (BP&N) estimator 608 represents circuitry and/or programming adapted to obtain noisy symbols before the demodulator 606, and estimate both the noise power and the signal power. For example, the BP&N estimator 608 may obtain symbols, such as the symbols in the QPSK constellation in FIG. 4, and estimate both the noise and the signal power associated with the obtained symbols according to one or more of the SNR estimation techniques described herein.

The inner loop power controller (ILPC) 610 represents circuitry and/or programming adapted to implement a final estimation of the SNR. For example, the ILPC 610 may implement the final estimation of the SNR as a combination of the estimates from the Rake component 602 and from the BP&N estimator 608.

According to an aspect of the present disclosure, the receiver 512 may employ a maximum likelihood SNR calculation or estimation on the received symbols to estimate both the noise and the signal power, where the maximum likelihood SNR calculation is adapted to achieve the Cramér-Rao bound for SNR estimation. The Cramér-Rao bound expresses a lower bound on the variance of estimators of a deterministic parameter. In its simplest form, the bound states that the variance of any unbiased estimator is at least as high as the inverse of the Fisher information. An unbiased estimator which achieves this lower bound is said to be fully efficient. Such a solution achieves the lowest possible mean squared error among all unbiased methods, and is therefore the minimum variance unbiased (MVU) estimator.

Figure 7:
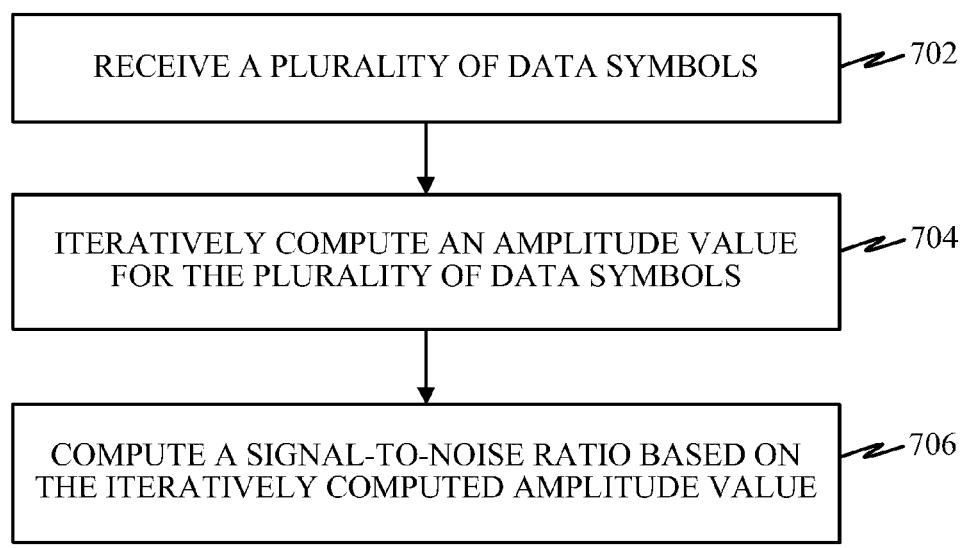
FIG. 7 is a flow diagram illustrating at least one example of a method operational on a wireless communication device employing a maximum likelihood SNR calculation of the present disclosure.

The maximum likelihood (ML) SNR calculation may be based on an iterative solution of the maximum likelihood equation set forth below. Turning to FIG. 7, a flow diagram is depicted illustrating at least one example of a method operational on a wireless communication device, such as the wireless communication device 500, employing the ML SNR calculation described herein. Referring to FIGS. 5 and 7, the wireless communication device 500 can receive a plurality of data symbols at 702. For example, the receiver 512 may receive a plurality of QPSK data symbols via the communications interface 502. For example, FIG. 4 is a graphical illustration of QPSK data symbols that may be received by the receiver 512 via the communications interface 502.

With the plurality of data symbols, the wireless communication device 500 may iteratively compute an amplitude value 'A' for the plurality of data symbols at 704. For example, the receiver 512 executing the SNR estimation operations 508 may calculate a weighted mean of the amplitude 'A' for each data symbol, where each of the four quadrants referred to above with reference to FIG. 4 contribute differently to the weighted mean according to the probability that the data symbol is within each respective quadrant. The resulting weighted means of the amplitudes 'A' derived for each received data symbol can then be used to calculate an arithmetic mean.

More specifically, the receiver 512 executing the SNR estimation operations 508 may calculate the amplitude value 'A' for the plurality of data symbols according to the following fixed-point equation:

$$A = \frac{-1}{2N} \sum_{k=1}^{N} \left[ \frac{\sum_{m=1}^{4} \alpha_{m,k} \cdot e^{-\frac{\alpha_{m,k} \cdot A}{M_2 - A^2}}}{\sum_{m=1}^{4} e^{-\frac{\alpha_{m,k} \cdot A}{M_2 - A^2}}} \right].$$

Here, corresponding to the received symbols '$r_k$' in each of the four quadrants described above with reference to FIG. 4, $\alpha_{1,k} \triangleq \sqrt{2}(-Re(r_k) - Im(r_k))$ $\alpha_{2,k} \triangleq \sqrt{2}(+Re(r_k) - Im(r_k))$ $\alpha_{3,k} \triangleq \sqrt{2}(+Re(r_k) + Im(r_k))$, and $\alpha_{4,k} \triangleq \sqrt{2}(-Re(r_k) + Im(r_k))$.

The total power '$M_2$', including the signal and the noise, can be estimated by the equation:

$$M_2 \triangleq \frac{1}{N} \sum_{k=1}^{N} |r_k|^2.$$

The above equation for 'A' may be solved iteratively, for example, utilizing a suitable initial starting point '$A_0$'. In some examples, the initial starting point may correspond to $A_0 = \sqrt{M_2/2}$. In another example, the initial starting point may correspond to $A_0 = \sqrt{\hat{E}_{s,ub}}$. Here, $\hat{E}_{s,ub} = \hat{E}_s/(b+1)$, where b is a bias coefficient corresponding to the equation $b = 0.18 \cdot e^{-8.5 \cdot (\hat{\gamma}-2)} + 0.36 \cdot e^{-1.58 \cdot (\hat{\gamma}-2)}$.

Once a suitable starting point '$A_0$' is obtained, the above equation for 'A' may be computed iteratively, with successive values being computed according to the following equation:

$$A_{n+1} = \frac{-1}{2N} \sum_{k=1}^{N} \left[ \frac{\sum_{m=1}^{4} \alpha_{m,k} \cdot e^{-\frac{\alpha_{m,k} \cdot A_n}{M_2 - A_n^2}}}{\sum_{m=1}^{4} e^{-\frac{\alpha_{m,k} \cdot A_n}{M_2 - A_n^2}}} \right].$$

In various examples, any suitable number of iterations may be utilized. For example, the equation may be iterated up to selected threshold, e.g., $|A_{n+1} - A_n| < \epsilon \cdot M_2$. In other examples, a predetermined number of iterations may be utilized.

At 706, the wireless communication device 500 can compute a signal-to-noise ratio based on the iteratively computed amplitude value 'A'. For example, the receiver 512 executing the SNR estimation operations 508 may compute the SNR estimate using the amplitude value 'A'. More specifically, assuming 'L' represents the number of iterations utilized above, the receiver 512 executing the SNR estimation operations 508 may compute the signal power according to $\hat{E}_s = A_L^2$. The receiver 512 executing the SNR estimation operations 508 may also compute the noise power according to $\hat{I}_{oc} = M_2 - \hat{E}_s$. With the signal power and noise power estimates computed, the receiver 512 executing the SNR estimation operations 508 can compute the SNR estimate according to:

$$\hat{\gamma} = \frac{\hat{E}_s}{\hat{I}_{oc}}.$$

As noted above, employing the iterative maximum likelihood SNR calculation described above can result in a SNR estimation that can achieve the Cramér-Rao bound. In some instances, however, the computational complexity of the described maximum likelihood SNR calculation may be significant. In some implementations of the present disclosure, a two-stage procedure may be implemented, whereby a less computationally-complex decision directed estimation is employed first. If the decision directed estimation is sufficient, then the wireless communication device 500 may use the results for the SNR estimation in processing the received data symbols. If the decision directed estimation is not sufficient, then the wireless communication device 500 can perform a second stage calculation, which can include a maximum likelihood calculation in at least some scenarios.

Figure 8:
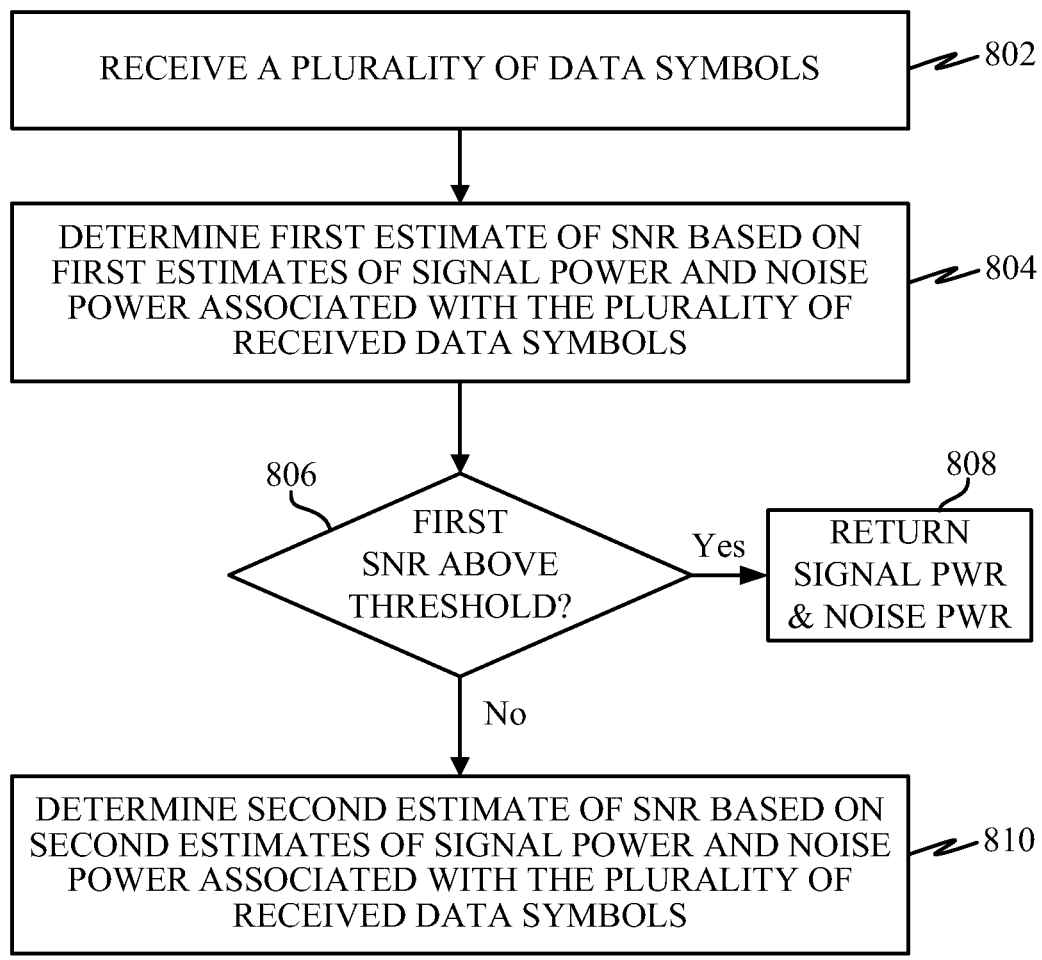
FIG. 8 is a flow diagram illustrating at least one example of a method operational on a wireless communication device for employing a two-stage SNR estimation.

FIG. 8 is a flow diagram illustrating at least one example of a method operational on a wireless communication device, such as the wireless communication device 500, for employing a two-stage SNR estimation. Referring to FIGS. 5 and 8, a wireless communication device 500 can receive a plurality of data symbols at 802. For example, the receiver 512 may receive a plurality of QPSK data symbols via the communications interface 502. As an example, FIG. 4 is a graphical illustration of QPSK data symbols that may be received by the receiver 512 via the communications interface 502.

At 804, the wireless communication device 500 can determine a first estimate of the signal-to-noise ratio based on a first estimated signal power and a first estimated noise power associated with the plurality of received data symbols. For example, the receiver 512 executing the SNR estimation operations 508 may compute a first estimate of signal power '$\hat{E}_s$' and noise power '$\hat{I}_{oc}$' utilizing a decision-directed estimation procedure.

In at least one example, the estimates of the signal power '$\hat{E}_s$' and the noise power '$\hat{I}_{oc}$' may be computed from the received symbols '$r_k$' according to, $$E[|r_k^2|] = E[|Ae^{j\Phi_k}|^2] + E[|n_k^2|] = A^2 + 2\sigma^2$$

To obtain an estimate of the total power $M_2$, including the signal and the noise, the expectations in the above equation may be replaced with their corresponding temporal averages, yielding the total power equation referred to above:

$$M_2 \triangleq \frac{1}{N} \sum_{k=1}^{N} |r_k|^2.$$

When the SNR is high, it may be unlikely for a received symbol to cross a decision boundary, and thus, the energy estimation of the received symbols may correspond to the mean of the real and imaginary parts. That is, $$a \triangleq \sqrt{\frac{\hat{E}_s}{2}} = \frac{1}{2}\left(\frac{1}{N}\sum_{k=1}^{N} |\text{Re}(r_k)|\right) + \frac{1}{2}\left(\frac{1}{N}\sum_{k=1}^{N} |\text{Im}(r_k)|\right)$$

or $$a = \frac{1}{2N} \cdot \sum_{k=1}^{N} [|\text{Re}(r_k)| + |\text{Im}(r_k)|],$$

where $$\hat{E}_S = 2a^2.$$

An estimate of the power of the noise may be accordingly computed corresponding to the difference between the total power '$M_2$' and the estimated signal power. That is, $$\hat{I}_{oc} = M_2 - \hat{E}_s.$$

With the first estimate of signal power and the first estimate of noise power, a signal-to-noise ratio can be determined. That is, the first estimation '$\hat{\gamma}$' of the SNR corresponds to:

$$\hat{\gamma} = \frac{\hat{E}_s}{\hat{I}_{oc}}.$$

This first estimate can provide a computationally simple algorithm for providing a first SNR estimation, utilizing a relatively lower computational complexity than the maximum likelihood computation described previously. In particularly high SNR conditions, this first stage can perform sufficiently well for the SNR estimation. Accordingly, the wireless communications device 500 can determine whether the first estimate of the SNR is above a predetermined threshold at step 806. For example, the receiver 512 executing the SNR estimation operations 508 may compare the first SNR estimation to a predetermined threshold. In at least one example, the threshold may be about 10 (e.g., $\hat{\gamma} > 10$), although any suitable threshold value may be utilized within the scope of the present disclosure.

If the first SNR estimation is above the predetermined threshold, the wireless communication device 500 can return the first estimates of signal power and noise power for processing the data symbols, at step 808. On the other hand, if the first SNR estimation is not above the desired threshold, the wireless communication device 500 can determine a second estimate of a SNR based on second estimates of signal power and noise power associated with the received data symbols, at step 810. For example, the receiver 512 executing the SNR estimation operations 508 may compute second estimates for signal power and noise power.

According to various implementations, the second estimates may be calculated in a manner to achieve better performance, especially in low SNR conditions. As noted above, the maximum likelihood SNR calculation may be employed in the second estimation. Furthermore, in various implementation, an additional computation, referred to herein as a Z-method calculation, may also be available for the second SNR estimate computations. In such examples, the particular computation employed to obtain the second SNR estimate may depend on the number of samples received at the receiver 512. The Z-method calculation, which will be described in more detail below, is computationally simpler than the maximum likelihood calculation described above.

Figure 9:
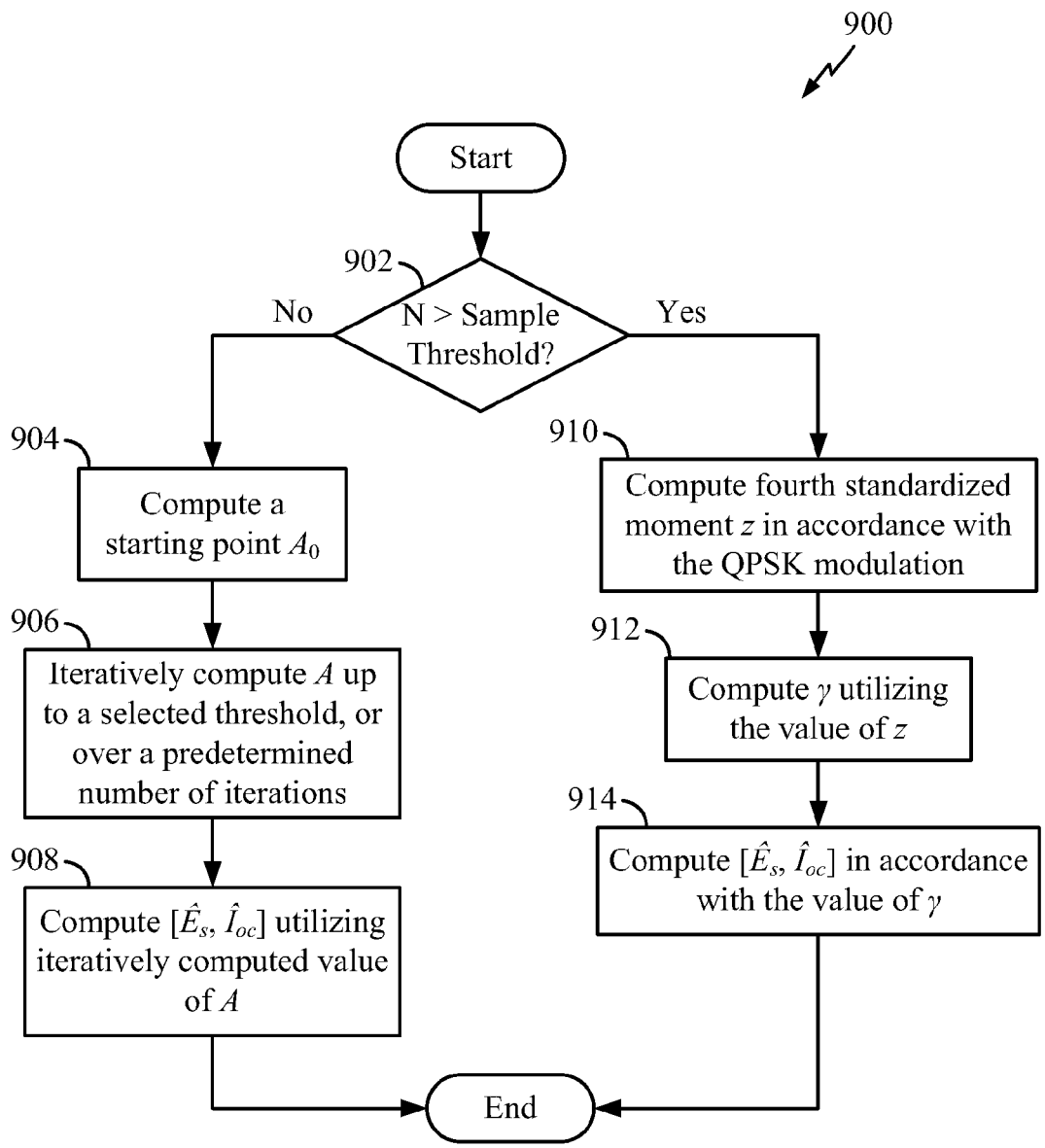
FIG. 9 is a flow diagram illustrating at least one example of an algorithm that may be employed for the second SNR estimation of the method in FIG. 8.

FIG. 9 is a flow diagram illustrating at least one example of an algorithm 900 that may be employed for the second SNR estimation of step 810 in FIG. 8. At decision diamond 902, the receiver 512 executing the SNR estimation operations 508 may determine whether the number of samples received is above some threshold. By way of example and not limitation, the threshold for the number of samples may be about 128 samples, as it has been observed that the maximum likelihood SNR calculation and the Z-method calculation achieve at least substantially similar performance with this number of samples. However, depending on design choices and the importance in a particular implementation of computational complexity and performance, the threshold number of samples for selecting between the maximum likelihood SNR calculation and the Z-method calculation may be set to any suitable value.

If the number of samples is determined to be below the predetermined threshold, the receiver 512 executing the SNR estimation operations 508 can employ the maximum likelihood SNR calculation described above. That is, at operation 904, the receiver 512 executing the SNR estimation operations 508 can compute a suitable starting point '$A_0$' for an iterative solution for the second SNR estimate. At operation 906, the receiver 512 executing the SNR estimation operations 508 may iteratively compute an amplitude value 'A', either up to a selected threshold e.g., $|A_{n+1} - A_n| < \epsilon \cdot M_2$ or over a predetermined number of iterations, according to a particular implementation. Here, the iterations may be determined according to the equation $$A_{n+1} = \frac{-1}{2N} \sum_{k=1}^{N} \left[ \frac{\sum_{m=1}^{4} \alpha_{m,k} \cdot e^{-\frac{\alpha_{m,k} \cdot A_n}{M_2 - A_n^2}}}{\sum_{m=1}^{4} e^{-\frac{\alpha_{m,k} \cdot A_n}{M_2 - A_n^2}}} \right],$$

as described above.

Finally, at operation 908, the receiver 512 executing the SNR estimation operations 508 may compute second estimate of signal power '$\hat{E}_s$' and noise power '$\hat{I}_{oc}$' utilizing the iteratively computed amplitude value 'A', and with these values, may generate a second SNR estimate '$\hat{\gamma}$.'

On the other hand, if the number of samples is determined at 902 to be above the desired threshold, the receiver 512 executing the SNR estimation operations 508 can employ the so-called Z-method calculations. The Z-method for SNR estimation may be based on fourth and second moment statistics. That is, the second and fourth moments may be utilized to establish a relation between the observations $r_k$ and the SNR. The Z-method estimation is generally a Kurtosis calculation. Accordingly, the Z-method estimation can be generally defined as a measure reflecting the degree to which a distribution is peaked. That is, the Z-method estimation provides information regarding the height of the distribution relative to the value of its standard deviation.

In particular, at operation 910, the receiver 512 executing the SNR estimation operations 508 may compute a Kurtosis, or fourth standardized moment z, depending on the QPSK modulation. For example, the fourth standardized moment z, may be calculated according to the ratio:

$$z \triangleq \frac{(E(|r_k|^2))^2}{E(|r_k|^4)}.$$

With this value, the receiver 512 executing the SNR estimation operations 508 can compute the second SNR estimate at operation 912. For example, a quick estimation of the SNR can be calculated according to the equation:

$$\text{SNR} \triangleq \gamma = d_3 \cdot e^{(d_0 \cdot e^{(d_1 z)} + d_2 z)},$$

where $d_0 = 4.1$, $d_1 = 0.4$, $d_2 = 4.07$, and $d_3 = 9.87 \cdot 10^{-4}$.

This SNR estimation algorithm can provide a rough estimation. However, in accordance with an aspect of the present disclosure, the application of information corresponding to the QPSK modulation can provide an improved SNR estimation compared to this rough estimation. That is, QPSK modulation of symbols '$r_k$' may be represented by $r_k = (\pm a + n_I) + j \cdot (\pm a + n_Q)$. Here, by using the following statistical known quantities corresponding to a Gaussian Distribution:

$E[n_I^2] = \sigma^2;$ $E[n_I^3] = 0;$ $E[n_I^4] = 3\sigma^4;$ $E[n_Q^2] = \sigma^2;$ $E[n_Q^3] = 0;$ and $E[n_Q^4] = 3\sigma^4,$ it can be found that the value of z relates to the SNR '$\gamma$' as follows:

$$z \triangleq \frac{(E(|r_k|^2))^2}{E(|r_k|^4)} =$$

$$\frac{4a^4 + 8a^2\sigma^2 + 4\sigma^4}{4a^4 + 16a^2\sigma^2 + 8\sigma^4} \underset{1/\sigma^4}{\overset{1/\sigma^4}{=}} \frac{\frac{4a^4}{\sigma^4} + \frac{8a^2}{\sigma^2} + 4}{\frac{4a^4}{\sigma^4} + \frac{16a^2}{\sigma^2} + 8} \underset{\gamma = \frac{a^2}{\sigma^2}}{=} \frac{\gamma^2 + 2\gamma + 1}{\gamma^2 + 4\gamma + 2}.$$

By solving this equation for z, the value of the SNR estimate '$\gamma$' as a function of z may corresponds to the following:

$$\text{SNR} \triangleq \hat{\gamma} = \frac{1 - 2z - \sqrt{z(2z-1)}}{z - 1}.$$

Here, in order to obtain an estimate of z, the expectations may be replaced with their corresponding temporal averages, as follows:

$$z \triangleq \frac{\left(\frac{1}{N}\sum_{k=1}^{N} |r_k|^2\right)^2}{\frac{1}{N}\sum_{k=1}^{N} |r_k|^4}.$$

With these values obtained, the receiver 512 executing the SNR estimation operations 508 can compute the signal power '$\hat{E}_s$' and noise power '$\hat{I}_{oc}$' estimates from the SNR '$\gamma$' at operation 914, according to the following equations:

$$\hat{E}_s = M_2 \cdot \frac{\hat{\gamma}}{1 + \hat{\gamma}}$$

$$\hat{I}_{oc} = \frac{\hat{E}_s}{\hat{\gamma}}.$$

By employing one or more aspects of the present disclosure to estimate signal-to-noise ratios for received data symbols, wireless communication devices can achieve relatively accurate estimates in both high and low signal-to-noise ratio conditions. Furthermore, various aspects may enable such accurate estimates with relatively reduced computational complexity.

While the above discussed aspects, arrangements, and embodiments are discussed with specific details and particularity, one or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 5, and/or 6 may be configured to perform or employ one or more of the methods, features, parameters, and/or steps described in FIGS. 3, 4, 7, 8, and/or 9. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
a communications interface;
a storage medium; and
a receiver coupled to the communications interface and the storage medium, the receiver adapted to:
receive, via the communications interface, a plurality of data symbols;
determine a first estimate of a signal-to-noise ratio based on a first estimate of a signal power associated with the plurality of received data symbols and a first estimate of a noise power associated with the plurality of received data symbols; and
when the first estimate of the signal-to-noise ratio is below a predetermined threshold, determine a second estimate of a signal-to-noise ratio based on a second estimate of the signal power associated with the plurality of received data symbols and a second estimate of the noise power associated with the plurality of received data symbols, wherein:
the second estimate of the signal-to-noise ratio is determined from a maximum likelihood SNR calculation when a number of samples for the plurality of received data symbols is below a predefined threshold; and
the second estimate of the signal-to-noise ratio is determined from a Z-method calculation when the number of samples for the plurality of received data symbols is equal to or above the predefined threshold.

2. The wireless communication device of claim 1, wherein the receiver is adapted to determine the second estimate of the signal-to-noise ratio from the maximum likelihood SNR calculation by:
computing a weighted mean of an amplitude, A, for each of the plurality of received data symbols;
computing an arithmetic mean from the weighted mean of the amplitude, A, computed for each of the plurality of received data symbols; and
computing the second estimate of the signal-to-noise ratio based on the arithmetic mean.

3. The wireless communication device of claim 2, wherein the receiver is adapted to compute the weighted mean and to compute the arithmetic mean by:
computing an initial amplitude value, $A_0$; and
iteratively computing the amplitude, A, starting from the initial amplitude value, $A_0$, according to the calculation $$A_{n+1} = \frac{-1}{2N} \sum_{k=1}^{N} \left[ \frac{\sum_{m=1}^{4} \alpha_{m,k} \cdot e^{-\frac{\alpha_{m,k} \cdot A_n}{M_2 - A_n^2}}}{\sum_{m=1}^{4} e^{-\frac{\alpha_{m,k} \cdot A_n}{M_2 - A_n^2}}} \right].$$

4. The wireless communication device of claim 1, wherein the receiver is adapted to determine the second estimate of the signal-to-noise ratio from the Z-method calculation by:
computing a fourth standardized moment, z; and
computing the second estimate of the signal-to-noise ratio using the computed fourth standardized moment, z, in the calculation $$\overline{SNR} = \frac{1 - 2z - \sqrt{z(2z-1)}}{z-1}.$$

5. The wireless communication device of claim 1, wherein the plurality of received data symbols comprise a plurality of QPSK data symbols.

6. The wireless communication device of claim 1, wherein the first estimate of the signal-to-noise ratio is determined from a decision-directed SNR calculation.

7. A method operational on a wireless communication device, comprising:
receiving a plurality of data symbols;
determining a first estimate of a signal-to-noise ratio based on a first estimate of a signal power associated with the plurality of received data symbols and a first estimate of a noise power associated with the plurality of received data symbols; and determining a second estimate of a signal-to-noise ratio based on a second estimate of the signal power and a second estimate of the noise power when the first estimate of the signal-to-noise ratio is below a predetermined threshold, wherein determining the second estimate includes:

determining the second estimate of the signal-to-noise ratio using a maximum likelihood SNR calculation when a number of samples for the plurality of received data symbols is below a predefined threshold; and determining the second estimate of the signal-to-noise ratio using a Z-method calculation when the number of samples for the plurality of received data symbols is equal to or above the predefined threshold.

8. The method of claim 7, wherein determining the second estimate of the signal-to-noise ratio using the maximum likelihood SNR calculation comprises:

calculating an arithmetic mean from a weighted mean of an amplitude, A, for each of the plurality of received data symbols; and calculating the second estimate of the signal-to-noise ratio based on the arithmetic mean.

9. The method of claim 8, wherein calculating the arithmetic mean from the weighted mean of the amplitude, A, for each of the plurality of received data symbols comprises:

computing an initial amplitude value, $A_0$; and iteratively computing the amplitude, A, starting from the initial amplitude value, $A_0$, according to the calculation $$A_{n+1} = \frac{-1}{2N} \sum_{k=1}^{N} \left[ \frac{\sum_{m=1}^{4} \alpha_{m,k} \cdot e^{-\frac{\alpha_{m,k} \cdot A_n}{M_2 - A_n^2}}}{\sum_{m=1}^{4} e^{-\frac{\alpha_{m,k} \cdot A_n}{M_2 - A_n^2}}} \right].$$

10. The method of claim 9, wherein computing the initial amplitude value, $A_0$, comprises:

determining a total power, $M_2$, associated with the plurality of received data symbols; and computing the initial amplitude value, $A_0$, from the square root of half of the total power ($A_0 = \sqrt{M_2/2}$).

11. The method of claim 9, wherein computing the initial amplitude value, $A_0$, comprises:

determining the initial amplitude value, $A_0$, from the equation $A_0 = \sqrt{\hat{E}_{s,ub}}$, wherein $\hat{E}_{s,ub} = \hat{E}_s/(b+1)$, and wherein b is a bias coefficient corresponding to the equation $b = 0.18 \cdot e^{-8.5 \cdot (\hat{\gamma}-2)} + 0.36 \cdot e^{-1.58 \cdot (\hat{\gamma}-2)}$.

12. The method of claim 7, wherein determining the second estimate of the signal-to-noise ratio using the Z-method calculation comprises:

computing a fourth standardized moment, z, using the calculation $$z \triangleq \frac{\left(\frac{1}{N}\sum_{k=1}^{N}|r_k|^2\right)^2}{\frac{1}{N}\sum_{k=1}^{N}|r_k|^4};$$

computing the second estimate of the signal-to-noise ratio using the computed fourth standardized moment, z, with the calculation $$\widehat{SNR} = \frac{1 - 2z - \sqrt{z(2z-1)}}{z-1}.$$

13. The method of claim 7, wherein determining the first estimate of the signal-to-noise ratio based on the first estimate of the signal power and the noise power associated with the plurality of received data symbols comprises:

determining the first estimate of the signal power utilizing a decision-directed calculation where the signal power is calculated from $2a^2$, wherein $$a = \frac{1}{2N} \cdot \sum_{k=1}^{N} [|\text{Re}(r_k)| + |\text{Im}(r_k)|];$$

and determining the first estimate of the noise power utilizing a decision-directed calculation where the noise power is calculated from a total power minus the first estimate of the signal power, wherein the total power ($M_2$) is calculated from $$M_2 \triangleq \frac{1}{N}\sum_{k=1}^{N}|r_k|^2.$$

14. A wireless communication device, comprising:

means for receiving a plurality of data symbols;

means for determining a first estimate of a signal-to-noise ratio based on a first estimate of a signal power and a first estimate of a noise power associated with the plurality of received data symbols; and means for determining a second estimate of a signal-to-noise ratio based on a second estimate of the signal power and a second estimate of the noise power when the first estimate of the signal-to-noise ratio is below a predetermined threshold, wherein the means for determining the second estimate of the signal-to-noise ratio include:

means for determining the second estimate of the signal-to-noise ratio using a maximum likelihood SNR calculation when a number of samples is determined to be below a predefined threshold; and means for determining the second estimate of the signal-to-noise ratio using a Z-method calculation when the number of samples is determined to be equal to or above the predefined threshold.

15. The wireless communication device of claim 14, wherein the maximum likelihood SNR calculation comprises:

computing an arithmetic mean from a weighted mean of an amplitude, A, for each of the plurality of received data symbols; and calculating the second estimate of the signal-to-noise ratio based on the arithmetic mean.

16. The wireless communication device of claim 15, wherein computing the arithmetic mean from the weighted mean of the amplitude, A, for each of the plurality of received data symbols comprises:

computing an initial amplitude value, $A_0$; and iteratively computing the amplitude, A, starting from the initial amplitude value, $A_0$, according to the calculation $$A_{n+1} = \frac{-1}{2N} \sum_{k=1}^{N} \left[ \frac{\sum_{m=1}^{4} \alpha_{m,k} \cdot e^{-\frac{\alpha_{m,k} \cdot A_n}{M_2 A_n^2}}}{\sum_{m=1}^{4} e^{-\frac{\alpha_{m,k} \cdot A_n}{M_2 - A_n^2}}} \right].$$

17. The wireless communication device of claim 14, wherein the Z-method calculation comprises:

computing a fourth standardized moment, z, using the calculation $$z \triangleq \frac{\left(\frac{1}{N} \sum_{k=1}^{N} |r_k|^2\right)^2}{\frac{1}{N} \sum_{k=1}^{N} |r_k|^4};$$

and computing the second estimate of the signal-to-noise ratio using the computed fourth standardized moment, z, with the calculation $$\overline{SNR} = \frac{1 - 2z - \sqrt{z(2z-1)}}{z - 1}.$$

18. The wireless communication device of claim 14, wherein the means for determining the first estimate of the signal-to-noise ratio based on the first estimate of the signal power and the noise power associated with the plurality of received data symbols comprises:

means for determining the first estimate of the signal power calculated from $2a^2$, wherein $$a = \frac{1}{2N} \cdot \sum_{k=1}^{N} [|\text{Re}(r_k)| + |\text{Im}(r_k)|];$$

and means for determining the first estimate of the noise power calculated from a total power minus the first estimate of the signal power, wherein the total power ($M_2$) is calculated from $$M_2 \triangleq \frac{1}{N} \sum_{k=1}^{N} |r_k|^2.$$

19. A non-transitory processor-readable storage medium, comprising programming for causing a processing circuit to:

receive a plurality of data symbols;

determine a first estimate of a signal-to-noise ratio based on a first estimate of a signal power and a first estimate of a noise power associated with the plurality of received data symbols; and determine a second estimate of a signal-to-noise ratio based on a second estimate of the signal power and a second estimate of the noise power when the first estimate of the signal-to-noise ratio is below a predetermined threshold, wherein the processing circuit:

determines the second estimate of the signal-to-noise ratio from a maximum likelihood SNR calculation when a number of samples for the plurality of received data symbols is below a predefined threshold; and determines the second estimate of the signal-to-noise ratio from a Z-method calculation when the number of samples for the plurality of received data symbols is equal to or above the predefined threshold.

20. The non-transitory processor-readable storage medium of claim 19, wherein the maximum likelihood SNR calculation comprises:

computing a weighted mean of an amplitude, A, for each of the plurality of received data symbols;

computing an arithmetic mean from the weighted mean of the amplitude, A, computed for each of the plurality of received data symbols; and computing the second estimate of the signal-to-noise ratio based on the arithmetic mean.

21. The non-transitory processor-readable storage medium of claim 20, wherein the weighted mean of the amplitude, A, for each of the plurality of received data symbols and the arithmetic mean are computed by:

computing an initial amplitude value, $A_0$; and iteratively computing the amplitude, A, starting from the initial amplitude value, $A_0$, according to the calculation $$A_{n+1} = \frac{-1}{2N} \sum_{k=1}^{N} \left[ \frac{\sum_{m=1}^{4} \alpha_{m,k} \cdot e^{-\frac{\alpha_{m,k} \cdot A_n}{M_2 - A_n^2}}}{\sum_{m=1}^{4} e^{-\frac{\alpha_{m,k} \cdot A_n}{M_2 - A_n^2}}} \right].$$

22. The non-transitory processor-readable storage medium of claim 19 wherein the Z-method calculation comprises:

computing a fourth standardized moment, z, from $$z \triangleq \frac{\left(\frac{1}{N} \sum_{k=1}^{N} |r_k|^2\right)^2}{\frac{1}{N} \sum_{k=1}^{N} |r_k|^4};$$

and computing the second estimate of the signal-to-noise ratio using the computed fourth standardized moment, z, in the calculation $$\widehat{SNR} = \frac{1 - 2z - \sqrt{z(2z-1)}}{z-1}.$$

23. The non-transitory processor-readable storage medium of claim 19, wherein the plurality of received data symbols comprise a plurality of QPSK data symbols.

24. The non-transitory processor-readable storage medium of claim 19, wherein the first estimate of the signal-to-noise ratio is determined from a decision-directed SNR calculation.

* * * * *